United States Patent [19]

Ali et al.

[11] Patent Number: 4,696,768

[45] Date of Patent: Sep. 29, 1987

[54] PROCESS FOR THE SEPARATION OF LARGE AMOUNTS OF URANIUM FROM SMALL AMOUNTS OF RADIOACTIVE FISSION PRODUCTS, WHICH ARE PRESENT IN BASIC, AQUEOUS CARBONATE CONTAINING SOLUTIONS

[75] Inventors: Sameh A. H. Ali, Ettlingen; Juergen Haag, Worms, both of Fed. Rep. of Germany

[73] Assignee: Kernforschungszentrum Karlsruhe GmbH, Fed. Rep. of Germany

[21] Appl. No.: 762,364

[22] Filed: Aug. 5, 1985

[30] Foreign Application Priority Data

Aug. 4, 1984 [DE] Fed. Rep. of Germany ....... 3428877

[51] Int. Cl.[4] ....................... C01G 43/00; C22B 60/02; C09K 3/00

[52] U.S. Cl. ........................................ 252/628; 423/2; 423/7; 423/17

[58] Field of Search .................. 423/2, 7, 17; 252/628

[56] References Cited

U.S. PATENT DOCUMENTS

| | | | |
|---|---|---|---|
| 2,811,412 | 10/1957 | Poirier | 423/7 |
| 2,864,667 | 12/1958 | Bailes et al. | 423/7 |
| 3,155,455 | 11/1964 | Hart | 423/7 |
| 3,835,044 | 9/1974 | Schulz | 423/7 |
| 3,922,231 | 11/1975 | Carlin et al. | 423/2 |
| 4,280,985 | 7/1981 | Yon | 423/7 |
| 4,460,547 | 7/1984 | Sameh et al. | 423/7 |

FOREIGN PATENT DOCUMENTS

| | | | |
|---|---|---|---|
| 0170796 | 2/1986 | European Pat. Off. | 423/7 |

*Primary Examiner*—Edward A. Miller
*Attorney, Agent, or Firm*—Sughrue, Mion, Zinn, Macpeak, and Seas

[57] ABSTRACT

A process for separating large amounts of uranium from small amounts of radioactive fission products, which are present in basic, aqueous carbonate containing solutions, by means of a basic, organic anion exchanger. Uranium values present as uranykl-carbonato complex in a basic, aqueous, carbonate containing solution can be separated from fission products of the group ruthenium, zirconium, niobium and lanthanide, and with a relatively high degree of decontamination as well. The aqueous solution is adjusted to a ratio of uranyl ion concentration to carbonate ion- or $CO_3^{--}/HCO_3^-$ concentration of $1(UO_2^{++})$ to $4.5(CO_3^{--}$, or $CO_3^{--}/HCO_3^-)$, or more, at a maximum U concentration of not more than 60 g/l. The adjusted solution is led over a basic anion exchanger made from a polyalkene matrix provided with a preponderant part tertiary and a minor part quaternary amino groups to adsorb fission products ions or fission products containing ions. The unadsorbed uranyl-carbonato complex is recovered in a decontaminated, preponderantly fission product free form by separating the uranium containing, remaining aqueous solution from the ion exchanger.

10 Claims, No Drawings

PROCESS FOR THE SEPARATION OF LARGE AMOUNTS OF URANIUM FROM SMALL AMOUNTS OF RADIOACTIVE FISSION PRODUCTS, WHICH ARE PRESENT IN BASIC, AQUEOUS CARBONATE CONTAINING SOLUTIONS

BACKGROUND OF THE INVENTION

The present invention relates to a process for the separation of large amounts of uranium from small amounts of radioactive fission products, which are present in basic, aqueous carbonate containing solutions, by means of an organic, basic anion exchanger.

Until now, in order to recycle irradiated nuclear fuel elements from compounds, or alloys of highly enriched uranium, respectively, nuclear reactor fuel elements were dissolved in nitric acid and the uranium separated by liquid/liquid extraction, as for example in the Purex process, or by amine extraction, or by column chromatography separation operations, and reprocessed in a nitric acid medium.

The nitric acid recycling of nuclear fuels, especially the Purex process, is a reliable process that has been known for a long time. Nevertheless, it is extremely problematic that targets cooled for a short time (for example, cooling periods of 1 to 30 days) can be reprocessed with nitric acid. The disadvantages of nitric acid reprocessing of targets which have cooled for a short time are as follows:

The presence of the shorter lived fission products, especially iodine-131 and xenon-133, make the use of holdback systems or delay beds, respectively, extremely necessary. With the use of nitric acid (other acids cannot be used because of their corrosivity) and the associated possibility of developing $NO_2$, the most effective and also most economical filter material, activated carbon, may not be applied, because otherwise, in case $NO_2$ is released, there would be an acute danger of combustion in the waste gas lines.

Further, all fluid/fluid extraction processes are especially difficult to manage for high grade systems charged with I-131 and Xe-133 (as in this case), because, along with the danger of Xe-133 emissions, there is the additional possibility, which has considerably more serious consequences, of HI and iodine emissions from the acidic system.

A further disadvantage of the fluid/fluid extraction is the increased expenditure necessary to avoid the danger of combustion caused by the extraction agent diluent. The use of noncombustible diluents, such as carbon tetrachloride, is not recommended in this extremely highly active system because of the pronounced radiation sensitivity and the increased danger of corrosion by the released hydrochloric acid.

In addition, all efficient extraction chromatography processes known until now occur in acid systems and have, along with the previously cited disadvantage of the HI and $I_2$ release, respectively, an additional great disadvantage, that is the fixing of uranium from the main portion in the process stream, with reduced holdback of the fission products. The disadvantage of this method is quite obvious: For nuclear fuel holdback, incomparably larger column volumes must be prepared.

It is known to reprocess uranium dioxide, or alkali diuranate residues of high U-235-enrichment, respectively, extremely contaminated with fission products such as one obtained after the alkaline decomposition of material-test-reactor-fuel elements. The elements consist preponderantly of a uranium/aluminum alloy of the approximate composition $UAl_3$, coated with aluminum. Because of the variable Al content in the compound, the designation $UAl_x$ is usually used. This fuel element type is frequently established as the starting target for the production of fission product nuclides for nuclear medicine and technology. For that, usually smaller elements are exposed by thermal neutron streams of about $1\times10^{14}$n/sec cm$^2$ for 5 to 10 days. In order to minimize loss of the desired nuclide by decay, the irradiated targets are transported to the reprocessing installation after a minimum cooling time of about 12 hours. Usually, an alkaline decomposition of the target with 3 to 6 molar soda lye, or potash lye, respectively, serves as the first chemical step. In this first chemical step, the main constituent of the plate, the aluminum, and the fission products soluble in this medium, such as the alkaline and alkaline earth ions, as well as antimony, iodine, tellurium, tin and molybdenum, go into the solution, while the volatile fission products, above all xenon, together with hydrogen formed from the Al solution, leave the solvent at the upper end of the reflux cooler. Hydrogen can be oxidized to water over CuO, while xenon is preferably held back at normal temperature on activated carbon delay beds. The non-spent uranium remains as insoluble residue, usually about 99% of the initially irradiated amount, as $UO_2$ or alkali diuranate, respectively, together with the insoluble fission product species, above all ruthenium, zirconium, niobium and lanthanides in the form of their oxides.

This residue is treated in a known method with the action of air or of an oxidation agent, as, for example, $H_2O_2$ or hypochlorite, with an aqueous, carbonate- and hydrogen carbonate-ion containing solution of pH 5 to pH 11. The concentration of the carbonate ions can reach a maximum of 2.5 m/l and that of the hydrogen carbonate ions a maximum of about 1.0 m/l. During this treatment, the oxides of the uranium and of the named fission product species enter the solution as carbonato-complexes.

For purposes of economy and safety, this briefly cooled, extremely contaminated nuclear fuel must be recycled, retargeted and then stored. The usual method with nitric acid solution, however, is excluded for reprocessing briefly cooled fuel elements on a technically achievable scale, as already explained, because of the raised iodine-131 contamination even after the treatment, as well as the known combustion danger of the activated carbon in the presence of nitrogen oxides.

SUMMARY OF THE PRESENT INVENTION

A primary object of the present invention is to create a process with which uranium values present in a basic, aqueous, carbonate containing solution can be separated from fission products of the group ruthenium, zirconium, niobium and lanthanide, and with a relatively high degree of decontamination as well.

Another object of the present invention is to provide such a process wherein uranium or the fission products ruthenium, zirconium, niobium and lanthanides, in particular, should be able to be extensively decontaminated, after the alkaline decomposition a fuel element from a Material-Test-Reactor (MTR).

A further object of the present invention is to provide such a process which is safe to operate and low in waste, and is suitable for use with uranium dioxide- and alkali diuranate-containing residue cooled only for a few days.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for separating large amounts of uranium from small amounts of radioactive fission products, which are present in basic, aqueous carbonate containing solutions in which the uranium is present in the form of uranyl-carbonato complex, by means of a basic, organic anion exchanger, comprising: (a) adjusting the aqueous solution to a molar ratio of uranyl ion concentration to carbonate ion-concentration or $CO_3^{--}/HCO_3^-$ concentration of $1(UO_2^{++})$ to at least $4.5(CO_3^{--}$, or $CO_3^{--}/HCO_3^-)$, at a maximum U concentration of not more than 60 g/l, (b) leading the adjusted solution over a basic anion exchanger comprised of a polyalkene matrix provided with a preponderant part tertiary and a minor part quaternary amino groups to adsorb fission product ions or fission products containing ions, and (c) recovering the unadsorbed uranyl-carbonato complex which is decontaminated and preponderantly fission product free by separating the uranium containing, remaining aqueous solution from the ion exchanger.

The starting solution in the process of the present invention can be every $UO_2^{++}$ and $CO_3^{--}$ or $UO_2^{++}$ and $CO_3^{--}$ and $HCO_3^-$ ions containing solution. For example the starting solution can be a solution described as above in the penultimate paragraph of the Background of the Invention.

The ion exchanger charged with fission products can be led to fission product extraction or to waste solidification.

In a preferred embodiment of the process according to the present invention, the aqueous solution is adjusted to a molar ratio of uranyl ion concentration to carbonate ion concentration or to carbonate ion/hydrogen carbonate ion concentration of 1:5 to 1:8. The aqueous solution is advantageously adjusted to a uranium concentration of 60 g/l at a molar ratio of $UO_2^{++}$ concentration to $CO_3^{--}/HCO_3^-$ concentration of 1:5.

If the $UO_2^{++}$ concentration in the solution is low (for example less than 0.1 g/l) the $UO_2^{++}/CO_3^{--}$ or $UO_2^{++}/CO_3^{--}HCO_3^-$ ratio can be markedly more than 1:8 (for example 1:15). If the $UO_2^{++}$ amount is about 60 g/l the maximum possible ratio of $UO_2^{++}/CO_3^{--}$ or $UO_2^{++}/CO_3^{--}HCO_3^-$ can be quite near to 1:8. If the carbonate concentration is higher, then the solubility of the uranyltricarbonate complex will be markedly reduced and the complex will precipitate.

The lowest practical concentration of $UO_2^{++}$ in the solution is about 0.1 g/l.

A basic ion exchanger such as one comprising a polyalkene-epoxy-polyamine with tertiary and quaternary amino groups of the chemical structure $R—N^+(CH_3)_2(C_2H_4OH)Cl^-$ preferably is used, wherein R represents the molecule without amino groups.

Advantageously, the adjusted aqueous solution has a hydrogen carbonate ion concentration between 0 and 1 mol/l. The $CO_3^{--}$ concentration in the adjusted aqueous solution preferably amounts to a maximum of 2.5 m/l, and the pH value of the adjusted aqueous solution preferably is the range of pH 7 to pH 11.

The process according to the present invention can also be carried out in the absence of $HCO_3^-$ ions, yet the process conditions can more easily be adjusted when $HCO_3^-$ ions are present in the adjusted aqueous solution.

It is to be understood that both the foregoing general description and the following detailed description are exemplary and explanatory, but are not restrictive of the invention.

DETAILED DESCRIPTION OF THE INVENTION

The range of application of the process of the present invention spans a large variation in concentration of the uranium stream to be decontaminated. When the uranium concentration in the solution is very small compared to the carbonate concentration, so that, for example, a free $CO_3^{--}/HCO_3^-$ concentration higher than 0.6 mol/l is present, then for optimizing the fission product holdback, rrestriction of the too large carbonate excess can be accomplished either by metered addition of a mineral acid, preferably $HNO_3$, to destroy carbonate ions, or by addition of, for example, $Ca(OH)_2$, whereby a certain amount of carbonate ions are removed.

However, in the reverse case, that is, when higher uranium concentrations are present, then, with the addition of sufficient amount of $CO_3^{--}/HCO_3^-$ ions, the uranium distribution coefficient must be minimized so that the fission product species are not displaced by the uranium from the ion exchanger. The desired separations can still be conducted at uranium concentrations of about 60 g U/l. The limitation of the process at higher U concentrations is based on the solubility of uranium in carbonate-hydrogen carbonate solutions.

Indeed, a process for the separation of actinide ions from aqueous, basic, carbonate containing solutions is known from German Published Application No. 31 44 974 and corresponding U.S. Pat. No. 4,460,547, in which the actinide ions are adsorbed on basic ion exchangers as carbonato complexes, and after separation of the charged ion exchanger from the original solution by means of an aqueous solution, are again desorbed from the ion exchanger and further processed. In the process described in German Published Application No. 31 44 974 and U.S. Pat. No. 4,460,547 the basic anion exchanger for the adsorption of the actinide ions is a polyalkene matrix provided with a preponderant part of tertiary and a minor part of quaternary amino groups, yet this process can only rationally be used on aqueous, carbonate containing waste solutions or wash solutions, etc. For corresponding solutions with a relatively high content of uranyl ions, the expenditure for equipment would become too high and the exact maintenance of the carbonate ion—— concentrations in the range of the ratio $UO_2^{++}$ concentration to $CO_3^{--}$ concentrations between 1:3 and 1:4 can be problematic in some cases. Moreover, the process according to German Published Patent Application No. 31 44 974 and U.S. Pat. No. 4,460,547 is too complicated for larger uranium concentrations in the solution, because the uranyl ions, in contrast to the process according to the present invention, are adsorbed by the anion exchanger, whereby the fission product ions run through the ion exchanger with the remaining solution and the uranium must again be eluted from the ion exchanger. Moreover, in the process according to the present invention, the uranyl ions are not firmly attached by the same anion exchanger method, but rather only the still present fission product species are firmly attached.

The essential advantages of the process according to the present invention reside in the facts (1) that the decontamination of the uranium from the fission products still present can be conducted with a relatively small amount of anion exchanger, for example, in a relatively small ion exchanger column, (2) that the ion exchanger charged with the fission product, when only the uranium values are to be extracted, (with or without column) can be given directly to the waste-treatment and -removal without intermediate treatment, and (3) when the fission product nuclides are to be produced, the charged ion exchanger can be led for further processing of the fission product nuclides and separation from each other. The fission products can be eluted from the ion exchanger column with an alkaline- or ammonium-carbonate solution of higher molarity (about 1 to 2 m/l) or with nitric acid. By repeating the process according to the present invention one or several times on additional small anion exchanger batches, a high degree of purity of the uranium to be recovered is achieved.

Because the process according to the present invention can be conducted quickly, a disadvantageous formation of degradation products (as, for example, occurs with the extraction process, one such example being the degradation of the extraction agent or of the dilution agent) is avoided in the cycle of recovery and recycling of uranium into nuclear fuel. The process according to the present invention is characterized by being conducted very safely. For example, in no phase of the process must the organic anion exchanger be brought into contact with corrosive or strong oxidizing agents.

The process according to the present invention works with basic media, which offer the highest possible insurance against release of volatile iodine components. The adjusted solution used in the process according to the present invention, which can contain up to a maximum 2.5 mol/l $Na_2CO_3$ and at lower $CO_3^{--}$ concentrations up to about 1 mol/l $NaHCO_3$, is chemically simple to control and radiochemically resistant. Corrosion problems do not exist. Moreover, the expenditure on chemicals, equipment and work time is very low in the process according to the invention.

The basic anion exchanger which can be used in the practice of the present invention preferably is comprised of a polyalkene epoxy polyamine with tertiary and quaternary amino groups having the chemical composition:

$R—N^+(CH_3)_2Cl^-$ and $R—N^+(CH_3)_2(C_2H_4OH)Cl^{31}$ (the chloride can be replaced for example by nitrate or carbonate) where R represents the polyalkene epoxy portion, and known under the tradename Bio-Rex 5, made by Bio-Rad Laboratories, Richmond, Calif. U.S.A. For all practical purposes there are no other functional groups. The matrix is all one epoxy polymer. The polyalkene matrix preferably is provided in the majority (more than 50% of the total number of amino groups) with tertiary and in the minority with quaternary amino groups. The ratio of tertiary to quaternary amino groups on the polyalkene matrix of the basic anion exchanger preferably is ten to one, respectively.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE

In two dynamic column flow experiments, at different uranium to carbonate/hydrogen carbonate ratios, the effectiveness of the process according to the present invention was investigated.

The average fission product hold back by the ion exchanger with a column flow under the given load conditions was >97% for cerium, zirconium and niobium; for ruthenium the hold back by the ion exchanger was about 80%.

In the following the conditions and results are given individually:

Volume of feed solution being treated: 100 ml

U-content 1.19 g

| | Experiment 1 | Experiment 2 |
|---|---|---|
| Molar Ratio of U: $CO_3^-/HCO_3^-$: | 1:7 | 1:6 |
| $Na_2CO_3$: | 3.24 g = 90 mol % | 2.78 g = 90 mol % |
| $NaHCO_3$: | 0.28 g = 10 mol % | 0.24 g = 10 mol % |
| Column | | |
| Diameter | 15 mm | |
| Height | 130 mm | |
| Bed Volume | 20 ml | |
| Feed Rate | 0.5 ml/cm$^2$ · sec. | |
| Aftertreatment (wash) solution | 0.2 molar $Na_2CO_3$—solution | |
| Number of Washes | 4 washes, with each wash being conducted with 20 ml of wash solution | |

In place of a $Na_2CO_3$ aftertreatment wash solution, also another corresponding alkali- or ammonium-carbonate solution can be used.

Ion exchanger

Moderate basic anion exchanger made from polyalkene-epoxy-polyamine with tertiary and quaternary amino groups with the trade name Bio-Rex 5 (from the firm Bio-Rad Laboratories, USA).

Experiment 1
% of Value in Solution That Passed Through Ion Exchanger

| | Uranium | Cerium | Ruthenium | Zirconium | Niobium |
|---|---|---|---|---|---|
| 100 ml Feed Solution | 81.7 | 1.66 | 13.43 | 1.36 | 1.06 |
| 20 ml Wash Solution 1 | 14.8 | 0.32 | 4.06 | 0.26 | 0.19 |
| 20 ml Wash Solution 2 | 2.1 | 0.27 | 1.31 | 0.18 | 0.13 |
| 20 ml Wash Solution 3 | 0.8 | 0.14 | 0.55 | 0.09 | 0.06 |
| 20 ml Wash Solution 4 | 0.4 | 0.10 | 0.29 | 0.07 | 0.05 |
| Total | 99.8 | 2.49 | 19.64 | 1.96 | 1.49 |

| Experiment 2 % of Value in Solution That Passed Through Ion Exchanger | | | | | |
|---|---|---|---|---|---|
| | Uranium | Cerium | Ruthenium | Zirconium | Niobium |
| 100 ml Feed Solution | 80.5 | 1.84 | 13.51 | 1.38 | 1.31 |
| 20 ml Wash Solution 1 | 15.0 | 0.35 | 4.20 | 0.27 | 0.22 |
| 20 ml Wash Solution 2 | 2.6 | 0.25 | 1.20 | 0.24 | 0.16 |
| 20 ml Wash Solution 3 | 1.0 | 0.15 | 0.43 | 0.08 | 0.06 |
| 20 ml Wash Solution 4 | 0.6 | 0.10 | 0.31 | 0.06 | 0.05 |
| Total | 99.7 | 2.69 | 19.65 | 2.03 | 1.80 |

It will be understood that the above description of the present invention is susceptible to various modifications, changes and adaptations, and the same are intended to be comprehended within the meaning and range of equivalents of the appended claims.

What is claimed is:

1. Process for separating large amounts of uranium from small amounts of radioactive fission products, which are present in basic, aqueous carbonate containing solutions in which the uranium is present in the form of uranyl-carbonato complex, by means of a basic, organic anion exchanger, comprising:

(a) adjusting the aqueous solution to a molar ratio of uranyl ion concentration to carbonate ion-concentration or $CO_3^{--}/HCO_3^-$ concentration of $1(UO_2^{++})$ to at least 4.5 ($CO_3^{--}$, or $CO_3^{--}/HCO_3^-$), at a maximum U concentration of not more than 60 g/l, (b) leading the adjusted solution over a basic anion exchanger comprising a polyalkene matrix provided with a preponderant part tertiary and a minor part quaternary amino groups to adsorb fission product ions or fission products containing ions, and (c) recovering the unadsorbed uranyl-carbonato complex, decontaminated and preponderantly fission product free, by separating the uranium containing, remaining aqueous solution from the ion exchanger.

2. Process according to claim 1, wherein the aqueous solution is adjusted to a molar ratio of uranyl ion concentration to carbonate ion/hydrogen carbonate ion concentration of 1:5 to 1:8.

3. Process according to claim 1, wherein the aqueous solution is adjusted to a U concentration of 60 g/l at a molar ratio of $UO_2^{++}$ concentration to $CO_3^{--}/HCO_3^-$ concentration of 1:15.

4. Process according to claim 1, wherein the basic anion exchanger is a polyalkene-epoxy-polyamine with tertiary and quaternary amino groups of the chemical structure $R—N^+(CH_3)_2Cl^-$ and $R—N^+(CH_3)_2(C_2H_4OH)Cl^-$, wherein R represent the molecule without amino groups.

5. Process according to claim 1, wherein the adjusted aqueous solution has a hydrogen carbonate concentration between 0 and 1 mol/l.

6. Process according to claim 1, wherein the $CO_3^{--}$ concentration in the adjusted aqueous solution amounts to a maximum of 2.5M/l.

7. Process according to claim 1, wherein the pH value of the adjusted aqueous solution is in the range of pH 7 to pH 11.

8. Process according to claim 1, wherein the ion exchanger charged with fission products is used for fission product recovery after separation from the remaining aqueous solution.

9. Process according to claim 1, wherein the ion exchanger charged with fission products is sent to waste solidification after separation from the remaining aqueous solution.

10. Process according to claim 1, wherein the aqueous solution has a $UO_2^{++}$ concentration of at least 0.1 g/l.

* * * * *